Patented Jan. 6, 1953

2,624,708

UNITED STATES PATENT OFFICE 2,624,708

INHIBITED POLYOXYALKYLENE GLYCOL FLUIDS

Theodore W. Langer, Buffalo, and Blake F. Mago, North Tonawanda, N. Y., assignors, by mesne assignments, to Union Carbide and Carbon Corporation, a corporation of New York No Drawing. Application June 23, 1950, Serial No. 170,058

5 Claims. (Cl. 252—47.5)

The invention is concerned with improved corrosion inhibitor compositions for polyoxyalkylene glycol fluids, the latter being of that particular type having water-solubility characteristics, which enables their use in aqueous solutions, or in the presence of substantial quantities of absorbed water.

The particular polyoxyalkylene fluids referred to are the addition products formed by the reaction of either a dihydroxy or a monohydroxy aliphatic alcohol with a mixture of ethylene oxide and 1,2-propylene oxide in which the ratios of the respective oxides are from about 25–75 to 75–25. With a dihydroxy alcohol starting material, polyoxyalkylene diols are produced by this reaction, and when a monohydroxy alcohol constitutes the starter, the resulting products are composed of monohydroxy aliphatic monoethers of the polyoxyalkylene chains as indicated. In both instances these products are viscous liquids of relatively high average molecular weight, and they are actually complex mixtures of either the monohydroxy or dihydroxy derivatives (dependent upon the starter compound) having polyoxyalkylene chains of different lengths. By suitable modification of the reaction conditions, and the quantities of added mixed alkylene oxides, products of increasing average molecular weights and viscosity can be produced, to suit any particular use desired for the fluids.

For a further, and more detailed, description of the fluid compositions of the invention, reference is made to U. S. Patents 2,425,755 and 2,425,845, issued August 19, 1947, in the names, respectively, of F. H. Roberts et al., and W. J. Toussaint et al. The lower-numbered patent discloses the monohydroxy oxyethylene-oxy 1,2-propylene alkyl monoether products, as formed by a reaction starting with a monohydroxy alcohol, and the other patent covers the oxyethylene-oxy 1,2-propylene diol addition products, made from a starter of ethylene glycol or other dihydroxy alcohol.

As already indicated these polyoxyalkylene glycol fluids are known to have certain water solubility, and in various uses, such as lubricants for wire drawing and other metal-forming operations, the fluids are often diluted with from five to ten or more parts of water. In other applications the fluids may be used in humid atmospheres or under other conditions where they may readily adsorb substantial quantities of water. Corrosion-inhibitor additives are therefore desirable in these fluids when used as indicated, and it is an object of this invention to provide improved inhibitor compositions for retarding or repressing the corrosive effect of water as contained in these polyoxyalkylene glycol fluids.

While there are many individual inhibitor compounds which may be partially effective as corrosion preventives in these fluids, we have found that a multiple component inhibitor addition is necessary for the most satisfactory over-all corrosion protection. The ingredient combination proposed by this invention consists of three components, a dicarboxylic acid, a water-soluble, high molecular weight amine, and a metal deactivator like mercaptobenzothiazole, with a particular selection of those compounds which have solubility in both the concentrated polyoxyalkylene glycol fluid and aqueous solutions of the fluid with as much as ten or more parts of water.

As the acid component of the inhibitor mixture, a material of preference is one known in the trade as "Emery's Dimer Acids." This is made by the Emery Industries, Inc., and is described as a commercial form of dimeric polymer consisting essentially of dilinoleic acid. Further information concerning the preparation of this product can be found in the Journal of the American Oil Chemists Society, 24, p. 65—March 1947. Other suitable acid ingredients are the alkenyl or alkyl succinic acids which contain six to fourteen carbon atoms in the alkenyl or alkyl group. The amine component preferably should be one high enough in molecular weight to be practically non-volatile, and materials of this type which have been used successfully are triisopropanolamine, diethylethanolamine, salicylaletheanolamine, and 2,4,6-tris(dimethylaminomethyl)phenol. As the third member of the inhibitor combination mercaptobenzothiazole has been very effective, although other materials of a similar function may be appropriate.

The relative amounts of each additive which may be required for satisfactory corrosion protection will vary with a particular fluid, as well as with the lubricant service, or other use, to which the fluid may be put. For present known purposes, however, a concentration range from about 0.5% to 5.0% by weight of both the acid and the amine component has been found entirely operable, with the mercaptobenzothiazole being present in smaller amounts, or from about 0.05% to 0.5% by weight.

Many tests have been made to evaluate the inhibitor effectiveness of the mixtures here proposed, and these show very clearly that all three of the components as indicated are essential to obtain a desirable and satisfactory corrosion protection. The Table I, to follow, shows some of the test results, made under a procedure which normally creates severe corrosive conditions. In these tests, specimens of steel, aluminum, brass, and copper were immersed for 200 hours, at 170° F., in a 10% aqueous solution of a monohydroxy oxyethylene-oxy 1,2-propylene butyl monoether, containing an oxide ratio of equal parts and having a viscosity of 260 Saybolt Universal seconds at 100° F. The solution contained 500 parts per million of sodium chloride and was continuously aerated with 0.028 cubic foot per minute of air.

TABLE I

*Corrosion test*

| | Additives | | | Corrosion Losses in Milligrams | | | |
|---|---|---|---|---|---|---|---|
| | Emery's dimer acids, percent | Triiso- propanol- amine, percent | Mercap- toben- zothia- zole, percent | Steel | Alu- minum | Brass | Copper |
| 1 | 2.0 | 1.25 | None | 832 | 110 | 148 | 149 |
| 2 | 2.0 | 1.25 | 0.2 | 4 | 2 | 9 | 7 |
| 3 | 2.0 | 1.25 | 0.05 | 3 | 3 | 8 | 8 |
| 4 | 2.0 | 2.0 | 0.05 | 7 | 6 | 18 | 17 |
| 5 | None | 2.0 | 0.2 | 1,734 | 55 | 20 | 10 |
| 6 | 2.0 | None | 0.2 | Unsuitable for test because additives insoluble in water | | | |
| 7 | 2.0 | 2.0 | None | 658 | 38 | 155 | 97 |

In the following Table II, tests on different inhibitor combinations are shown, in which the procedure and other test conditions are the same as those indicated for Table I, with the exception that the oxyethylene-oxy 1,2-propylene butyl monoether fluid used is of varying viscosity as indicated. These data also show the deficiency in corrosion protection resulting from the absence of only one of the components as required in the complete inhibitor mixture.

TABLE II

*Corrosion test*

| | Fluid viscosity SUS at 100° F. | Additives | | | Corrosion losses in milligrams | | | |
|---|---|---|---|---|---|---|---|---|
| | | Acid | Amine | Mercap- toben- zothia- zole, percent | Steel | Alumi- num | Brass | Copper |
| 1 | 400 | None | None | None | [1] 9,787 | [1] 458 | [1] 135 | [2] 258 |
| 2 | 170 | do | do | None | [1] 8,113 | [1] 34 | [1] 53 | [2] 56 |
| 3 | 170 | 2% Emery's dimer acids | 1.25% triisopropanolamine | 0.2 | 2 | 2 | 12 | 6 |
| 4 | 660 | do | do | 0.2 | 4 | 2 | 13 | 12 |
| 5 | 170 | do | 2% salicylalmonoethanolamine | 0.2 | 3 | 3 | 9 | 13 |
| 6 | 170 | do | 2% 2,4,6 - tris(dimethylamino- methyl)phenol. | 0.2 | 7 | 3 | 12 | 14 |
| 7 | 170 | 1% octenyl succinic acid | Diethylethanolamine [2] | None | 611 | 142 | 155 | 125 |
| 8 | 170 | do | do | 0.1 | 2 | 6 | 6 | 10 |
| 9 | 260 | 0.5% Octenyl succinic | Triisopropanolamine [2] | None | 1,172 | 650 | 405 | 362 |
| 10 | 260 | do | do | 0.1 | 4 | 8 | 11 | 13 |

[1] Test conducted in distilled water, which gives lower weight losses than 500 p. p. m. NaCl solution.
[2] Amine added in chemical equivalent proportion to neutralize acid and mercaptobenzothiazole.

Many modifications of the formulae illustrated in the above tables will be obvious, and can attain similar advantageous results. The polyoxyalkylene diols, as well as the monohydroxy monoether derivatives, and fluids of a wide range of viscosity, can be equally well protected by the proposed inhibitor mixtures. These variations in the final composition are all intended embodiments of the invention.

We claim:

1. A fluid composition consisting essentially of a monohydroxy oxyethylene-oxy 1,2-propylene butyl monoether composition containing equal parts of the respective oxyalkylene groups, and containing an inhibitor composition adapted to repress corrosion in aqueous solutions of the fluid, said inhibitor consisting essentially of a mixture of about 0.5% to 5.0% by weight of dilinoleic acid, about 0.5% to 5.0% by weight of triisopropanolamine, and about 0.05 to 0.5% by weight of mercaptobenzothiazole.

2. A fluid composition consisting essentially of an oxyethylene-oxy 1,2-propylene diol composition containing 75 parts to 25 parts of the respective oxyalkylene groups, and containing an inhibitor composition adapted to repress corrosion in aqueous solutions of the fluid, said inhibitor consisting essentially of a mixture of about 0.5% to 5.0% by weight of dilinoleic acid, about 0.5% to 5.0% by weight of triisopropanolamine, and about 0.05 to 0.5% by weight of mercaptobenzothiazole.

3. A fluid composition consisting essentially of a monohydroxy oxyethylene-oxy 1,2-propylene butyl monoether composition containing equal parts of the respective oxyalkylene groups, and having a viscosity of at least 170 Saybolt Universal seconds at 100° F., and containing an inhibitor composition adapted to repress corrosion in aqueous solutions of the fluid, said inhibitor consisting essentially of a mixture of 2.0% by weight of dilinoleic acid, 1.25% by weight of triisopropanolamine, and 0.2% by weight of mercaptobenzothiazole.

4. Fluid compositions composed of a polyoxyalkylene material of the class consisting of oxyethylene-oxy 1,2-propylene diols and aliphatic monoethers of said diols, in which the ratio of the respective oxyalkylene groups is from 25–75 to 75–25, and containing an inhibitor composition adapted to repress corrosion in aqueous solutions of the fluid, said inhibitor consisting essentially of a mixture of a dicarboxylic acid of the group consisting of dilinoleic acid and alkenyl and alkyl succinic acids, an amine compound of the group consisting of triisopropanolamine, diethylethanolamine, salicylalethanolamine, and 2,4,6-tris(dimethylaminomethyl)phenol, and mercaptobenzothiazole as a metal deactivating compound.

5. Fluid compositions composed of a polyoxyalkylene material of the class consisting of oxyethylene-oxy 1,2-propylene diols and aliphatic monoethers of said diols, in which the ratio of the respective oxyalkylene groups is from 25–75 to 75–25, and containing an inhibitor composition adapted to repress corrosion in aqueous solutions of the fluid, said inhibitor consisting essentially of a mixture of a dicarboxylic acid of the group consisting of dilinoleic acid and alkenyl and alkyl succinic acids in an amount of about 0.5% to 5.0% by weight, an amine compound of the group consisting of triisopropanolamine, diethylethanolamine, salicylalethanolamine, and 2,4,6-tris(dimethylaminomethyl)phenol in an amount of about 0.5% to 5.0% by weight, and about 0.05% to 0.5% by weight of mercaptobenzothiazole.

THEODORE W. LANGER.
BLAKE F. MAGO.

REFERENCES CITED

The following references are of record in the file of this patent:

UNITED STATES PATENTS

| Number | Name | Date |
|---|---|---|
| 2,334,158 | Fuchs et al. | Nov. 9, 1943 |
| 2,434,978 | Zisman | Jan. 27, 1948 |
| 2,481,278 | Ballard et al. | Sept. 6, 1949 |

FOREIGN PATENTS

| Number | Country | Date |
|---|---|---|
| 425,728 | Great Britain | Mar. 20, 1935 |
| 601,419 | Great Britain | May 5, 1948 |